United States Patent [19]

Koutlakis et al.

[11] Patent Number: 5,271,766
[45] Date of Patent: Dec. 21, 1993

[54] STARCH-BASED ADHESIVE COATING

[75] Inventors: George Koutlakis, Greenfield Park; Ruben P. Lenz, Laval Sur Le Lac; Christopher C. Lane, Laprairie, all of Canada

[73] Assignee: ADM Agri-Industries, Ltd., Canada

[21] Appl. No.: 737,471

[22] Filed: Jul. 30, 1991

Related U.S. Application Data

[63] Continuation-in-part of Ser. No. 640,088, Jan. 11, 1991, abandoned.

[51] Int. Cl.$^5$ ................. C09D 103/02; C09D 103/04; C09D 103/06; C09D 103/08
[52] U.S. Cl. .................................... 106/213; 106/203; 106/208
[58] Field of Search ......................... 106/213, 203, 208

[56] References Cited

U.S. PATENT DOCUMENTS

| | | | |
|---|---|---|---|
| 3,072,537 | 1/1963 | Stonehill | 106/213 |
| 3,425,968 | 2/1969 | Reiling . | |
| 4,238,057 | 12/1980 | Matsunaga et al. | 106/213 |
| 5,096,491 | 11/1992 | Nagai et al. | 106/213 |

FOREIGN PATENT DOCUMENTS 2115855 10/1972 Fed. Rep. of Germany ...... 106/213

*Primary Examiner*—David Brunsman
*Attorney, Agent, or Firm*—Laff, Whitesel, Conte & Saret

[57] ABSTRACT

A sheet-like paper article is provided with a dry adhesive coating which can be rendered tacky by wetting with water at room temperature by preparing a starch-based adhesive preparation comprising an aqueous slurry of cold water swellable starch in water, the slurry also containing an alcohol selected from the group consisting of methanol, ethanol, propanol, butanol, hexanol, decanol, their isomers and mixtures thereof, and the alcohol having a concentration sufficient to substantially prevent the water from causing the starch to swell. The alcohol may be partly or completely replaced by a glycol, for example ethylene glycol or propylene glycol. The aqueous slurry is coated on a surface of the paper article, and the coated paper article is heated to remove the alcohol and/or glycol and water from the slurry coating and provide a dry starch-based adhesive coating which can be rendered tacky by wetting with water at room temperature.

34 Claims, No Drawings

STARCH-BASED ADHESIVE COATING

This application is a continuation-in-part of application Ser. No. 640,088 filed Jan. 11, 1991, now abandoned.

This invention relates to the production of paper articles coated on one surface with a dry adhesive which can be activated, i.e. rendered tacky, by wetting with water at room temperature to enable the paper article to be adhered to some other surface, the adhesive coating subsequently being allowed to dry and thereby retain the paper article on the other surface. Wallpaper is one example of a paper article to which the present invention can be applied. It will of course be understood that the invention can also be applied to other paper articles, such as envelopes, postage stamps and bottle labels.

Adhesives commonly used with pre-pasted wallpaper and other paper articles, such as those referred to above, are usually solvent-based. Since the adhesive is cold water activated, the adhesive is usually applied to the paper article by using an organic solvent, such as methyl ethyl ketone. The organic solvent is subsequently removed by heating. Unfortunately, organic solvent fumes produced by heating the organic solvent cause environmental problems in the manufacturing area. The wallpaper industry is consequently currently looking for a solution to this problem and in particular is looking for a suitable water-based adhesive.

It is therefore an object of the invention to provide an improved process for the production of paper articles coated on one surface with a dry cold water activated adhesive which does not require the use of a toxic organic solvent.

According to the invention, a process for providing a sheet-like paper article with a dry adhesive coating which can be rendered tacky by wetting with water at room temperature comprises providing a starch-based adhesive preparation comprising an aqueous slurry of cold water swellable starch in water, said slurry also containing an alcohol selected from the group consisting of methanol, ethanol, propanol, butanol, hexanol, decanol, their isomers and mixtures thereof, said alcohol having a concentration sufficient to substantially prevent the water from causing the starch to swell, coating the aqueous slurry on a surface of the paper article, and heating the coated paper article to remove alcohol and water from the slurry coating and provide a dry starch-based adhesive coating which can be rendered tacky by wetting with water at room temperature.

It is believed that the alcohol substantially prevents the starch from undergoing any substantial swelling by preventing any substantial amount of water from penetrating the starch granules. Thus, the aqueous slurry can be arranged to have an acceptable viscosity when it is being applied to the paper article. It will be noted that, compared to the prior art in which a volatile organic compound such as methyl ethyl ketone is used as a solvent, the simple alcohol used in the present invention is much less objectionable from an environmental point of view and in any event is used at a much lower concentration.

Other advantages of the invention are that the presence of the alcohol enables the concentration of starch to be higher than would otherwise be the case, and also enables modified starch with good water swelling properties, i.e. hi-hydration capacity, to be used.

The slurry may contain from about 5 to about 50% by weight of said alcohol, preferably from about 15 to about 30%. The alcohol preferably comprises ethanol.

Some of the alcohol may be replaced by a glycol, such as propylene glycol, which has the same effect as the alcohol and which, like the alcohol, is less objectionable from an environmental point of view than volatile organic compounds such as methyl ethyl ketone as used in the prior art. Ethylene glycol may also be used.

Thus, the slurry may contain from about 5 to about 25% by weight of said alcohol and from about 5 to about 30% by weight of said glycol.

It is also possible to replace all the alcohol with said glycol, preferably propylene glycol. In this case, the slurry may contain from about 5 to about 30% by weight of propylene glycol.

The starch may be selected from the group consisting of pre-gelatinized starches, derivatised starches and mixtures thereof. For example, the starch may be selected from the group consisting of phosphated starches, urea-treated starches, hydroxyl-propyl starches, hydroxyl-ethyl starches, carboxy-methylated starches and mixtures thereof. Advantageously, the starch may comprise phosphated and urea-treated starch.

The aqueous slurry may contain from about 5 to about 60% by weight of starch, preferably from about 20 to about 45%, and still more preferably from about 30 to about 40%.

The aqueous slurry may also contain from about 0.01 to about 10% by weight of a thickening agent to inhibit sedimentation of the starch and provides a slurry viscosity in the range of from about 40 to about 4,000 centipoises, preferably from about 100 to about 2,000 centipoises, and more preferably from about 400 to about 600 centipoises.

The thickening agent may be selected from the group consisting of natural gum, pre-gelatinized starch, derivatised starch, hydrophilic glass, hydrophilic clay, cellulose and mixtures thereof. Advantageously, the thickening agent is selected from the group consisting of xanthan gum, derivatised starch, cellulose and mixtures thereof.

Preferably, the thickening agent is xanthan gum, with a concentration preferably in the range of from about 0.01 to about 0.1% by weight.

The aqueous slurry may also contain from about 0.01 to about 2% by weight of a wetting agent, i.e. surfactant, to facilitate penetration of the aqueous slurry into the paper article. The wetting agent may comprise ethylene glycol.

Where the coated paper article is wallpaper, the aqueous slurry is preferably coated thereon with a density in the range of from about 1 to about 20 pounds per ream (2,750 square feet), preferably in the range of from about 3 to about 7 pounds per ream, to enable the wallpaper capable of being removed from a surface to which it has been applied without re-wetting the adhesive coating, i.e. dry strippable. When it is not desired that the coated paper article be dry strippable, for example if the paper article is an envelope flap or a postage stamp, it is simply necessary to coat the aqueous slurry on the paper article with a greater density.

The aqueous slurry may be applied to the paper article in any convenient manner which will be readily apparent to a person skilled in the art. The coated paper article is then heated to remove alcohol and water from the slurry coating. This may be effected by passing the coated paper article through an oven at a temperature in the range of from about 25° to about 150° C. until the coating is dry. The alcohol volatilises, with much of the water being removed at the same time. Some starch becomes pre-gelatinized, i.e. fully swollen, by water during the heating step, and such starch becomes bonded to the fibres of the paper article.

It will be noted that the present invention is not suggested by U.S. Pat. No. 3,425,968 (Reiling) which teaches a non-curling gum which comprises a dispersion of preferably microscopically sized globules of liquid gum (which may be starch) in a water in oil suspension wherein the continuous phase is a water insoluble resin or polymer dissolved in a solvent (which may be an alcohol or glycol). In contrast, the present invention teaches the provision of an aqueous slurry of cold water swellable starch in water (i.e. the continuous phase is water), the slurry also containing a sufficient concentration of said alcohol to substantially prevent the water from causing the starch to swell.

Examples of adhesive preparations in accordance with the invention are as follows:

EXAMPLE 1

200 g of a phosphated-ureated starch (Ogilvie C-300) was added to 100 g methanol, with 200 g tap water then being subsequently added. 24 g pre-gelatinized starch (Ogilvie Readigel-11) was then added to suspend the phosphated-ureated starch and to adjust the viscosity of the slurry to 100 cps.

EXAMPLE 2

400 g of phosphated-ureated starch (Ogilvie C-300) was blended with 267 g of a dextrin having a solubility of 80-85% (Ogilvie WW-82) and 333 g of raw A starch. To this mix was added a solution containing 900 g of water and 100 g of methanol. 10 g of hollow glass beads were added to obtain a final viscosity of 500 cps.

EXAMPLE 3

1 liter of a 2:1 water/butanol solution was added to a starch blend as in Example 2. 0.1 g of xanthan gum was added to prevent settling. The viscosity was 3525 cps after 24 hours.

EXAMPLE 4

0.5 g of ethylene glycol was added to the product of Example 3 as a wetting agent. The viscosity was 3520 cps after 24 hours.

EXAMPLE 5

Example 3 was repeated but with butanol being replaced by ethanol. The viscosity was 4000 cps after 24 hours.

EXAMPLE 6

230 g of phosphated-ureated starch (Ogilvie C-300) was added to a mixture of 100 g ethanol and 150 g propylene glycol, with 500 g of water being subsequently added. 16 g of a thickener (Phone-Paulenc C-1560) and 3.5 g caustic (for pH control) were also added. The viscosity was 450 cps after 24 hours.

EXAMPLE 7

230 g of phosphated-ureated starch (Ogilvie C-300) was added to a 260 g of propylene glycol, with 475 g of water subsequently being added. 16 g of a thickener (Phone-Paulenc C-1560), 6 g of a surfactant (Canada Wax & Coating CVW-25) and 3.5 g caustic (for pH control) were also added. The viscosity was 500 cps after 24 hours.

Other embodiments and examples of the invention will be readily apparent to a person skilled in the art, the scope of the invention being defined in the appended claims.

We claim:

1. A starch-based adhesive preparation comprising an aqueous slurry of cold water swellable starch in water, said slurry also containing from about 5 to about 50% by weight of a monohydric alcohol selected from the group consisting of methanol, ethanol, propanol, butanol, hexanol, decanol, their isomers and mixtures thereof, and from about 5 to 30% by weight of a glycol selected from the group consisting of ethylene glycol and propylene glycol, said alcohol and/or glycol having a concentration sufficient to substantially prevent the water from causing the starch to swell, said preparation being capable of being coated on a surface of a paper article which can then be heated to remove the alcohol and/or glycol and water from the slurry coating and provide a dry starch-based adhesive coating which can be rendered tacky by wetting with water at room temperature.

2. An adhesive preparation according to claim 1 wherein the aqueous slurry contains from about 5 to about 25% by weight of said alcohol.

3. An adhesive preparation according to claim 1 wherein the aqueous slurry contains from about 15 to about 30% by weight of said alcohol.

4. An adhesive preparation according to claim 1 wherein said alcohol comprises ethanol.

5. An adhesive preparation according to claim 4 wherein the aqueous slurry contains from about 15 to about 30% by weight of ethanol.

6. An adhesive preparation according to claim 1 wherein the alcohol comprises ethanol and the glycol comprises propylene glycol.

7. An adhesive preparation according to claim 1 wherein said glycol comprises propylene glycol.

8. An adhesive preparation according to claim 7 wherein the aqueous slurry contains from about 5 to about 30% by weight of propylene glycol.

9. An adhesive preparation according to claim 1 wherein the starch is selected from the group consisting of pre-gelatinized, derivatised starches, and mixtures thereof.

10. An adhesive preparation according to claim 9 wherein the starch is selected from the group consisting of phosphated starches, urea-treated starches, hydroxyl-propyl starches, hydroxyl-ethyl starches, carboxymethylated starches and mixtures thereof.

11. An adhesive preparation according to claim 10 wherein the starch comprises phosphated and urea-treated starch.

12. An adhesive preparation according to claim 11 wherein the aqueous slurry contains from about 5 to about 60% by weight of said starch.

13. An adhesive preparation according to claim 12 wherein the aqueous slurry contains from about 20 to about 45% by weight of said starch.

14. An adhesive preparation according to claim 13 wherein the aqueous slurry contains from about 30 to about 40% by weight of said starch.

15. An adhesive preparation according to claim 11 wherein the aqueous slurry contains from about 30 to about 40% by weight of phosphated and urea-treated starch.

16. An adhesive preparation according to claim 1 wherein said alcohol comprises ethanol and said starch comprises phosphated and urea-treated starch.

17. An adhesive preparation according to claim 16 wherein the aqueous slurry contains from about 15 to about 30% by weight of ethanol and from about 30 to about 40%. by weight of phosphated and urea-treated starch.

18. An adhesive preparation according to claim 1 wherein the aqueous slurry also contains from about 0.01 to about 10% by weight of a thickening agent to inhibit sedimentation of the starch and provide a slurry viscosity in the range of from about 40 to about 4,000 centipoises.

19. An adhesive preparation according to claim 18 wherein the thickening agent provides a slurry viscosity in the range of from about 100 to about 2,000 centipoises.

20. An adhesive preparation according to claim 19 wherein the thickening agent provides a slurry viscosity in the range of from about 400 to about 600 centipoises.

21. An adhesive preparation according to claim 18 wherein the thickening agent is selected from the group consisting of natural gum, pre-gelatinized starch, derivatised starch, hydrophilic glass, hydrophilic clay, cellulose and mixtures thereof.

22. An adhesive preparation according to claim 21 wherein the thickening agent is selected from the group consisting of xanthan gum, derivatised starch, cellulose and mixtures thereof.

23. An adhesive preparation according to claim 1 wherein the aqueous slurry also contains xanthan gum to inhibit sedimentation of the starch and to provide a slurry viscosity in the range of from about 100 to about 2,000 centipoises.

24. An adhesive preparation according to claim 23 wherein the aqueous slurry contains from about 0.01 to about 0.1% by weight of xanthan gum.

25. An adhesive preparation according to claim 1 wherein the aqueous slurry also contains from about 0.01 to about 2% by weight of a wetting agent to facilitate penetration of the aqueous slurry into the paper article.

26. An adhesive preparation according to claim 25 wherein the wetting agent comprises ethylene glycol.

27. An adhesive preparation according to claim 1 wherein the aqueous slurry contains from about 15 to about 30% by weight of ethanol, from about 30 to about 40% by weight of phosphated and urea-treated starch, from about 0.01 to about 0.1% by weight of xanthan gum and from about 0.01 to about 2% by weight of ethylene glycol.

28. A starch-based adhesive preparation comprising an aqueous slurry of cold water swellable starch selected rom the group consisting of phosphated and urea-treated starches and mixtures thereof, said slurry also containing a glycol selected from the group consisting of ethylene glycol and propylene glycol, said glycol having a concentration sufficient to substantially prevent the water from causing the starch to swell, said preparation being capable of being coated on a surface of a paper article which can then be heated to remove the glycol and water from the slurry coating and provide a dry starch-based adhesive coating which can be rendered tacky by wetting with water at room temperature.

29. An adhesive compound according to claim 28 wherein the starch comprises a phosphated starch.

30. An adhesive composition according to claim 28 wherein the aqueous slurry contains from about 5 to 30% by weight of said glycol.

31. An adhesive composition according to claim 28 wherein the glycol is propylene glycol.

32. An adhesive composition according to claim 28 wherein the aqueous slurry contains from about 5 to 60% by weight of said starch.

33. An adhesive composition according to claim 28 wherein the aqueous slurry contains from about 20 to about 45% by weight of said starch.

34. An adhesive composition according to claim 28 wherein the aqueous slurry contains from about 30 to about 40% by weight of said starch.

* * * * *